(12) United States Patent
Zhu (10) Patent No.: US 11,047,713 B2
(45) Date of Patent: Jun. 29, 2021

(54) LASER SCANNING METHOD AND APPARATUS

(71) Applicant: NINGBO ONSIGHT CO., LTD., Ningbo (CN)

(72) Inventor: Shaolan Zhu, Ningbo (CN)

(73) Assignee: NINGBO ONSIGHT CO., LTD., Ningbo (CN)

( * ) Notice: Subject to any disclaimer, the term of this patent is extended or adjusted under 35 U.S.C. 154(b) by 63 days.

(21) Appl. No.: 16/411,146

(22) Filed: May 14, 2019

(65) Prior Publication Data

US 2019/0265076 A1   Aug. 29, 2019

Related U.S. Application Data

(63) Continuation of application No. PCT/CN2016/105695, filed on Nov. 14, 2016.

(51) Int. Cl.
| | | |
|---|---|---|
| *G01D 5/32* | (2006.01) | |
| *G02B 27/30* | (2006.01) | |
| *G01D 5/26* | (2006.01) | |
| *G02B 6/293* | (2006.01) | |

(52) U.S. Cl.
CPC .............. *G01D 5/32* (2013.01); *G01D 5/26* (2013.01); *G02B 27/30* (2013.01); *G02B 6/2938* (2013.01)

(58) Field of Classification Search
CPC . G01D 5/32; G01D 5/26; G02B 27/30; G02B 6/2938
See application file for complete search history.

(56) References Cited

U.S. PATENT DOCUMENTS

| | | | |
|---|---|---|---|
| 7,060,967 B2 | 6/2006 | Thingbo et al. | |
| 2005/0074204 A1* | 4/2005 | Wilson | G02B 6/29383 385/24 |
| 2006/0131488 A1* | 6/2006 | Thingbo | G01D 5/3539 250/227.23 |
| 2007/0070482 A1* | 3/2007 | Khoshnevisan | G02B 5/284 359/209.1 |
| 2008/0121627 A1* | 5/2008 | Bruland | H01L 23/5258 219/121.67 |

(Continued)

FOREIGN PATENT DOCUMENTS

| | | |
|---|---|---|
| CN | 101975594 A | 2/2011 |
| CN | 102879022 A | 1/2013 |

(Continued)

OTHER PUBLICATIONS

Internation Search Report of PCT/CN2016/105695, dated Jul. 28, 2017.

*Primary Examiner* — John R Lee
(74) *Attorney, Agent, or Firm* — Osha Bergman Watanabe & Burton LLP (57) ABSTRACT

A laser scanning method and a laser scanning apparatus. The laser scanning method comprises: generating a periodic input laser signal with a plurality of non-overlapping wavelengths in multiple time periods within each period; coupling each wavelength of a plurality of non-overlapping wavelengths of input laser signals to the corresponding output channel of multiple spatially-separated output channels, and emitting light from each output channel at different exit angles from each other.

8 Claims, 4 Drawing Sheets

(56) References Cited

U.S. PATENT DOCUMENTS

| | | | |
|---|---|---|---|
| 2009/0095722 A1* | 4/2009 | Ehrmann | B23K 26/0624 |
| | | | 219/121.72 |
| 2015/0077764 A1* | 3/2015 | Braker | G01S 7/4818 |
| | | | 356/620 |
| 2015/0085884 A1* | 3/2015 | Fontaine | H04Q 11/0005 |
| | | | 370/542 |
| 2015/0176969 A1* | 6/2015 | Jensen | G01B 9/02091 |
| | | | 356/4.09 |
| 2015/0236809 A1* | 8/2015 | Dong | H04J 14/02 |
| | | | 398/79 |
| 2016/0286288 A1* | 9/2016 | Suzuki | H04Q 11/0005 |
| 2016/0320170 A1* | 11/2016 | Yun | G01B 9/02083 |
| 2016/0327779 A1* | 11/2016 | Hillman | G02B 23/04 |
| 2019/0265076 A1* | 8/2019 | Zhu | G02B 27/30 |

FOREIGN PATENT DOCUMENTS

| | | |
|---|---|---|
| CN | 103512510 A | 1/2014 |
| CN | 203534538 U | 4/2014 |
| CN | 104764471 A | 7/2015 |

\* cited by examiner

LASER SCANNING METHOD AND APPARATUS

CROSS-REFERENCE TO RELATED APPLICATIONS

This application is a continuation of International Patent Application No. PCT/CN2016/105695 with a filing date of Nov. 14, 2016, designating the United States, now pending. The content of the aforementioned application, including any intervening amendments thereto, are incorporated herein by reference.

TECHNICAL FIELD

The present disclosure relates to the field of laser scanning, and more particularly to a laser scanning method and apparatus.

BACKGROUND

LADAR scanning is used for scanning, ranging, positioning and etc by utilizing, laser, and is widely applied in automatic driving, robot navigation and positioning, 3D model construction, obstacle detection, human-computer interaction and other scenarios. The traditional laser beam scanning technologies mainly comprise mechanical scanning, MEMS(Micro-Electro-Mechanical System) micromirror scanning, electro-optic scanning, acousto-optic scanning and the like. In order to achieve the purpose of scanning, the traditional mechanical scanning controls the pointing direction of the laser beam through the movement of the optical reflector driven by the motor, which enables a large-caliber and large-angle scanning, and the reflector can bear high laser power. However, with low scanning frequency, it is difficult for the traditional mechanical scanning to break through magnitude of hundred hertz, and with low pointing accuracy of the beam, it is difficult to meet the application requirements of high-speed, high-precision laser scanning. The scanning micro-mirror of MEMS is a kind of micro-electro-mechanical system manufactured by semiconductor processing technology, with a more than kilohertz scanning frequency and high pointing accuracy. But due to the small mirror size and the limited laser power, it is difficult to meet the requirements of high power laser beam scanning. Electro-optic scanning uses the effect that the refractive index of the medium changes under the action of the electric field to control the pointing direction of the beam, which can achieve a high scanning frequency (above MHz) But the scanning angle range of the electro-optic scanning is limited, generally in the range of milliradian (mrad)) magnitude, difficult to meet the needs of large-scale laser scanning. The acousto-optic scanning utilizes the acousto-optic diffraction effect to control the pointing direction of the light beam, with scanning frequency above MHz and large scanning angel. However, the diffraction effect of the acousto-optic scanning generates a multi-level diffraction effect on the light beam, causing a great loss of laser energy.

SUMMARY

Embodiments of the present disclosure provide a laser scanning method that generates a periodic input laser signal with a plurality of non-overlapping wavelengths in multiple time periods within each period; coupling each wavelength of a plurality of non-overlapping wavelengths of input laser signals to the corresponding output channel of multiple spatially-separated output channels, and emitting light from each output channel at different exit angles from each other.

In some embodiments, emitting light from each output channel at different exit angles from each other comprises utilizing one or more optical lenses to direct light to emit from each output channel at different exit angles from each other.

In some embodiments, each channel of the multiple output channels is not parallel to each other.

In some embodiments, the exiting light is collimated by a plurality of lenses arranged at the output end of multiple output channels.

In other embodiments of the present disclosure provide a laser scanning apparatus, comprising a periodic laser generating, unit for generating a periodic input laser signal, which has a plurality of non-overlapping wavelengths in multiple time periods within each period; and a demultiplexing unit, coupling each wavelength of a plurality of non-overlapping wavelengths of input laser signals to the corresponding output channels of multiple spatially-separated output channels, and emitting light from each output channel at different exit angles from each other.

In some embodiments, the said demultiplexing unit comprises one or more optical lenses to direct light to emit from each output channel at different exit angles from each other.

In some embodiments, each channel of multiple output channels is not parallel to each other.

In some embodiments, the laser scanning apparatus further comprises a plurality of lenses arranged at the output end of multiple output channels to collimate the exiting light.

The embodiments of the present disclosure are helpful to solve at least some of the defects in the prior art described above, by means of spatially separating wavelength to achieve high-speed, large-angle, and high-power laser scanning radar.

The present disclosure is provided to facilitate a further understanding of the present disclosure, which is a part of the present application, but is merely illustrative of a non-limiting example of some inventions that embodies inventive concepts, and is not intended to limit.

BRIEF DESCRIPTION OF THE DRAWINGS

Embodiments of the present disclosure are described more fully with reference to the accompanying drawings. The drawings form a part of the present disclosure, however, to be construed as illustrative and not restrictive.

EMBODIMENTS

Various aspects of the illustrative embodiments herein will be described below using terms commonly employed by those skilled in the art to convey the substance of their work to others skilled in the art. However, it will be apparent to those skilled in the art that alternate embodiments may be practiced with only some of the described aspects. For purposes of explanation, specific numbers, material and configuration are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments, however, the order of description should not be construed as to imply that these operations are necessarily order dependent. In particular, these operations need not be performed in the order of presentation.

Those skilled in the art will appreciate that although the terms first, second, etc may be used herein to describe various elements, these elements are not limited by these terms. These terms are only used to distinguish elements from each other. For example, a first element may be referred to as a second element and similarly, a second element may be referred to as a first element without deviating from the scope of the present disclosure. As used herein, the term "and/or" includes any or all combinations of one or more of the associated listed items. The terminology used herein is for the purpose of describing particular embodiments and is not intended to limit. The singular forms"a" and "the" used herein are intended, to include the plural forms as well, unless the context clearly indicates otherwise. The term "comprising" and/or "comprising", when used herein, are/is intended to mean the presence of the recited features, integers, steps, operations, elements and/or components, but do/does not exclude the presence or addition of one or more other features, integers, steps, operations, elements, components, and/or combinations thereof.

In addition, the term "and/or" can mean "and", "or", "exclusive or", "one", "some but not all", "neither" and/or "both", but the scope of the subject matter is not limited in these aspects. In the appended description and/or claims, the terms "comprising" and "including" and derivatives thereof may be used, which shall be regarded as synonyms of each other. Similar references are used to refer to similar components.

Figure 1:
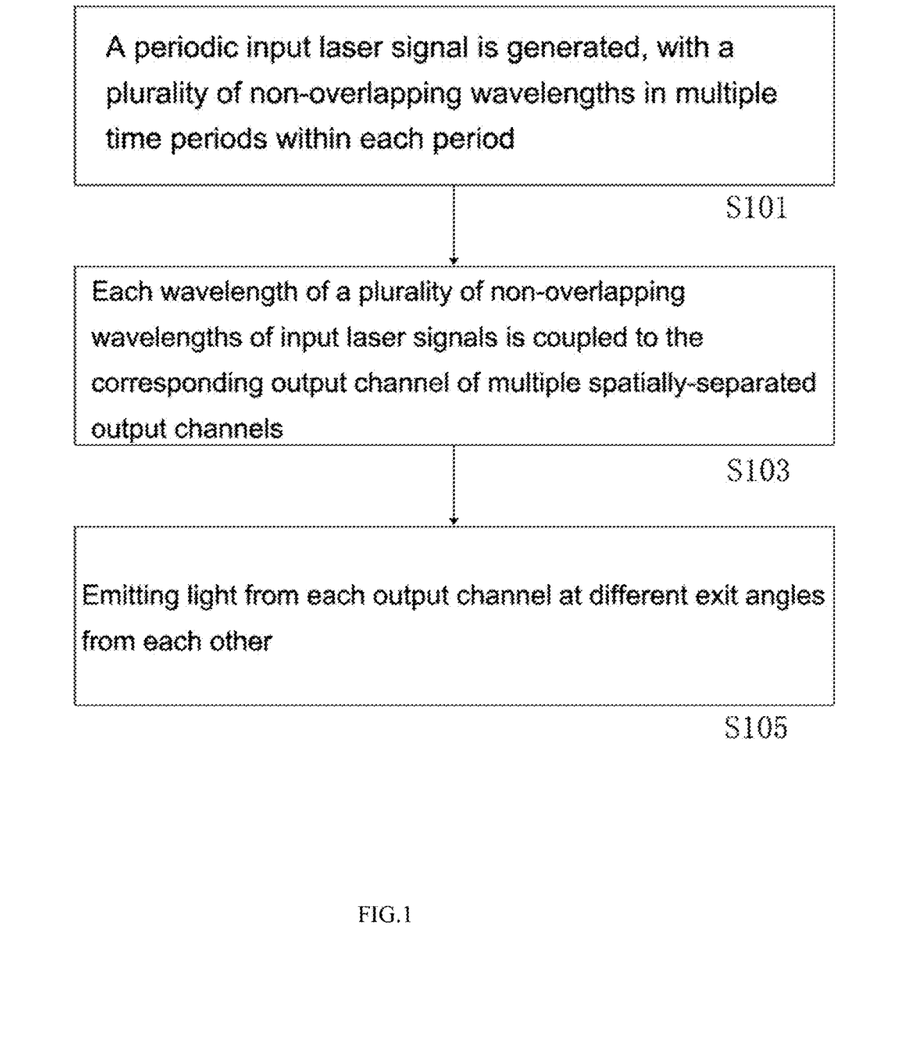
FIG. 1 is a flow diagram of a laser scanning method according to some embodiments of the present disclosure.

FIG. 1 shows a flow diagram of a laser scanning method according to some embodiments of the present disclosure Firstly, a periodic input laser signal is generated in step S101, with a plurality of non-overlapping wavelengths in multiple time periods within each period. The laser scanning radar in the prior art outputs a monochromatic laser, namely a single-wavelength laser or a narrow-band laser which close to a single wavelength, and scans the monochromatic laser with mechanical motor or an electro-optical material. In contrast to the prior art, according to the embodiments of the present disclosure, a laser with a plurality of non-overlapping wavelengths in each period is selected. A multi-wavelength laser can be obtained by modulating the output signal of a multi-wavelength laser device. The multi-wavelength lasers include, for example, but not limited, to, a wavelength tunable laser, a multi-wavelength fiber laser, a wide-spectrum laser, a white-light laser, a supercontinuum laser and/or a combination thereof. For ease of illustration, it is assumed in the embodiments herein that the multi-wavelength laser outputs an original laser signal comprising n wavelengths $\lambda 1, \lambda 2, \lambda 3, \lambda n$, where n>1. The said original laser signal including n wavelengths $\lambda 1, \lambda 2, \lambda 3, \lambda n$ which can be modulated into input laser signals of $\lambda 1, \lambda 2, \lambda 3, \lambda n$ respectively generated in a plurality of time periods t1, t2, t3, to within one period T by, for example, a driving circuit performing amplitude modulation, frequency modulation, phase modulation, intensity modulation, pulse modulation, and/or the like known to those skilled in the art. The time periods t1, t2, t3, to do not overlap with each other, and the wavelengths $\lambda 2, \lambda 3, \lambda n$ are not equal to each other. In some embodiments, $\lambda 1, \lambda 2, \lambda 3, \ldots \lambda n$ may represent a wave band with a certain wavelength range that do not overlap with each other. In some embodiments, the period T may be equal to the time required to complete a laser scan, such as the period to complete a 360-degree laser scan at one time. In alternative embodiments, the period T may be greater or shorter than the time required for one laser scan depending on user settings.

In step S103, each wavelength of a plurality of non-overlapping wavelengths of input laser signals is coupled to the corresponding output channel of multiple spatially-separated output channels. The step can be implemented by an optical multiplexer and/or a demultiplexer commonly used in the technical field of wavelength division multiplexing. Wavelength division multiplexing (WDM) refers to a technique in which an optical carrier signal including a plurality of wavelengths is collected by a multiplexer at a transmitting end and the optical carrier including a plurality of wavelengths separated by a demultiplexer at a receiving end. Herein, the multiplexer and the demultiplexer may be mutually substituted with each other to represent a multiplexer, a demultiplexer, or a combination device in which a multiplexer and a demultiplexer are simultaneously integrated. The apparatus for providing a plurality of output channels for separating different wavelengths includes, but not limited to, a grating multiplexer and a blazed grating multiplexer, a Bragg grating multiplexer, a dielectric film multiplexer, a thin film interference filter, an integrated optical waveguide multiplexer and/or an arrayed waveguide grating (AWG). After modulating the input laser signals of the wavelengths of $\lambda 1, \lambda 2, \lambda 3, \lambda n$ at said t1, t2, t3, tn, it is assumed that there are n output channels (n>1), then at time t1, the laser signal of wavelength is outputtedted in channel 1; at time t2, the laser signal of wavelength $\lambda 2$ is outputted in channel 2, and at time t3, the laser signal of wavelength $\lambda 3$ is outputted in channel 3; similarly, at time tn, the laser signal of the wavelength $\lambda n$ is outputted in the channel n. As described above, the input laser from the light source can be spatially separated by wavelength at different times. Spatially separated lasers of different wavelengths can be used to perform a laser scanning without mechanical motors or electro-optic effects, so that the scanning can be completed only by modulating the input laser.

In step S105, emitting light from each output channel at different exit angles from each other, thus in the far field, the light of each channel will be spatially separated. In some embodiments, the light of each channel after spatially separated is used for scanning a specific angle or range of angles in a scanning range. The optical path of the light exiting each channel can be further adjusted using optical waveguides known to those skilled in the art, such as optical waveguides, mirrors, and etc to match the scanning range in a particular application. In an exemplary embodiment, the scanning range is 360 degrees, the number of output channels n=6, and the exit angle of the emergent light of channel 1 is set to be 0 degree or 360 degrees, the emergent angles of the channels 2, 3, 4, 5 and 6 are correspondingly set to be 60 degrees, 120 degrees, 180 degrees, 240 degrees and 300 degrees. In this way, at time t1, the laser of the wavelength λ1 emitted from the channel 1 scans the object in the direction of 0 degree or 360 degrees; at time t2, the laser of the wavelength λ2 emitted from the channel 2 scans the object in the direction of 60 degrees. And so on, until at time t6, the laser of the wavelength λ6 emitted from the channel 6 scans the object in the direction of 300 degrees, a scanning period T with a scanning range of 360 degrees is completed, and then another period of scanning can be started. This scanning method doesn't require mechanical movements or refractive index changes of the scanning components, so that related mechanical and electrical structures are saved. Scanning by modulating the input laser signal can increase the scanning frequency, reduce the assembly cost of the device, and increase the power of the scanning laser. Means and structures for effecting the exiting of light from each output channel at different exit angles with respect to each other will be further described in the exemplary embodiments below.

Figure 2:
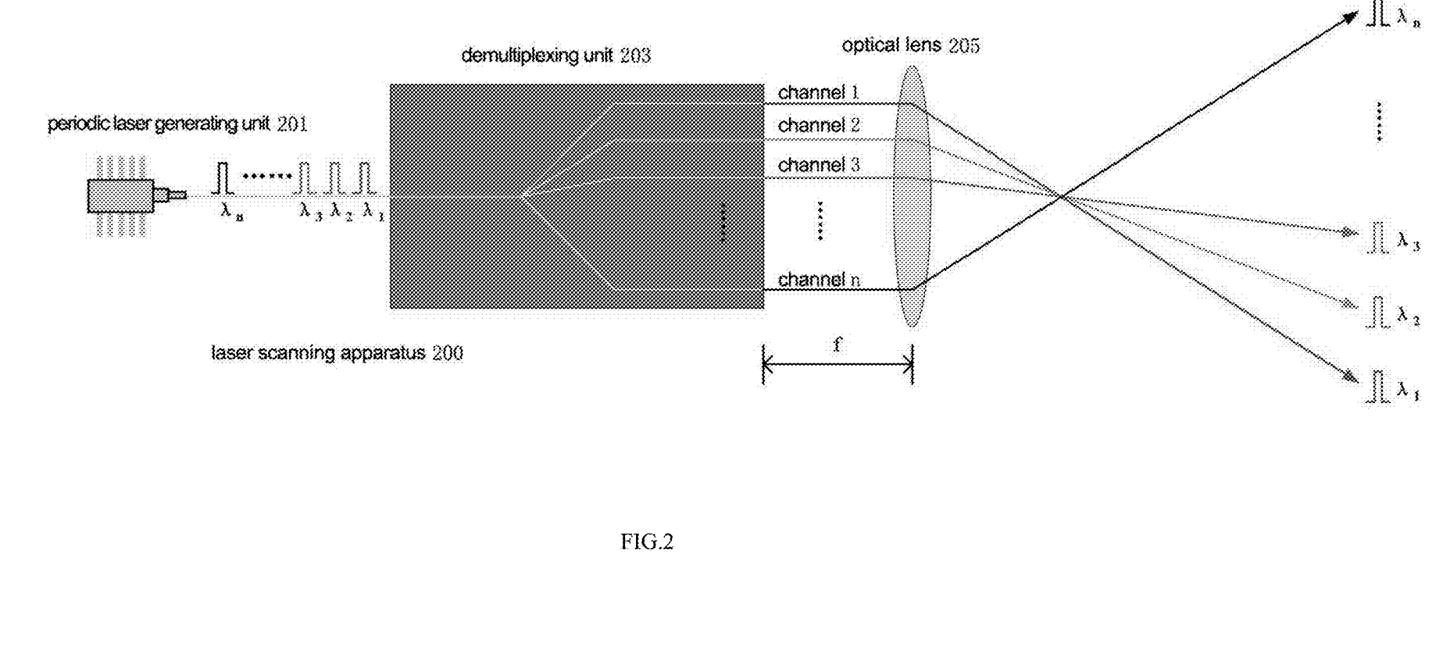
FIG. 2 is a schematic diagram of a laser scanning apparatus according to some embodiments of the present disclosure.

FIG. 2 illustrates an exemplary laser scanning device 200 in accordance with some embodiments of the present disclosure. The laser scanning device 200 comprises a periodic laser generating unit 201 for generating a periodic input laser signal with a plurality of non-overlapping wavelengths in multiple time periods within each period similar to what described above, as λ1, λ2, λ3, . . . λn. The periodic laser generating unit 201 can include a wavelength tunable laser, a multi-wavelength fiber laser, a wide-spectrum laser, a white-light laser, a supercontinuum laser and/or combinations thereof. The laser scanning device 200 further comprises a demultiplexing unit 203 including a plurality of spatially-separated output channels, for example, n channels, to couple each wavelength λi of a plurality of non-overlapping wavelengths λ1, λ2, λ3 . . . λn of the input laser signal to a corresponding output channel i (i=1, 2, 3 . . . , n) of a plurality of output channels. The demultiplexing unit 203 can comprises a grating multiplexer and a blazed grating multiplexer, a Bragg grating multiplexer, a dielectric film multiplexer, a thin film interference filter, an integrated optical waveguide multiplexer and/or an arrayed waveguide grating (AWG) The demultiplexing unit 203 further comprises an optical power amplifier, an optical line amplifier, an optical preamplifier, an optical interface converter, a wave plate and the like, which are commonly used in the field of wavelength division multiplexing. The multiple channels of the demultiplexing unit 203 comprise, for example, an optical waveguide, an optical fiber, a grating and etc. In general, the output of each channel of the demultiplexing unit 203 is parallel light, which is disadvantageous for spatially separating the light of each wavelength for laser scanning. Accordingly, laser scanning device 200 further comprises an optical lens 205, which include one or more optical lenses, although only one lens is shown in the figure. The output end of the output channel of the demultiplexing unit 203 can be located at the focal plane position of the optical lens 205. As is known to those skilled in the art, multiple output channels have been separated in space, thereby being at different positions on the focal plane of the optical lens 205, so that light of multiple wavelengths output from the plurality of output channels will be deflected to different directions after passing through the optical lens 205 to achieve laser scanning based on spatial wavelength separation. The optical lens 205 can also be used for collimating emergent light with a certain divergence angle, so as to provide a laser beam closer to the parallel light. The frequency or speed of laser scanning based on the spatial separation of wavelengths is completely determined by the wavelength modulation speed of the laser signal, so that the scanning frequency of MHz or even GHz can be more easily achieved. For the demultiplexing unit 203 with a fixed number of channels and channel intervals, the maximum scanning angle range is determined by the focal length of the optical lens 205; the shorter the focal length, the larger the scanning angle range is; the smaller the channel intervals, the longer the focal length, and the two adjacent wavelengths, e.g the smaller the separation angle of the laser beam between λi and λi+1, the higher the scanning resolution.

Figure 3:
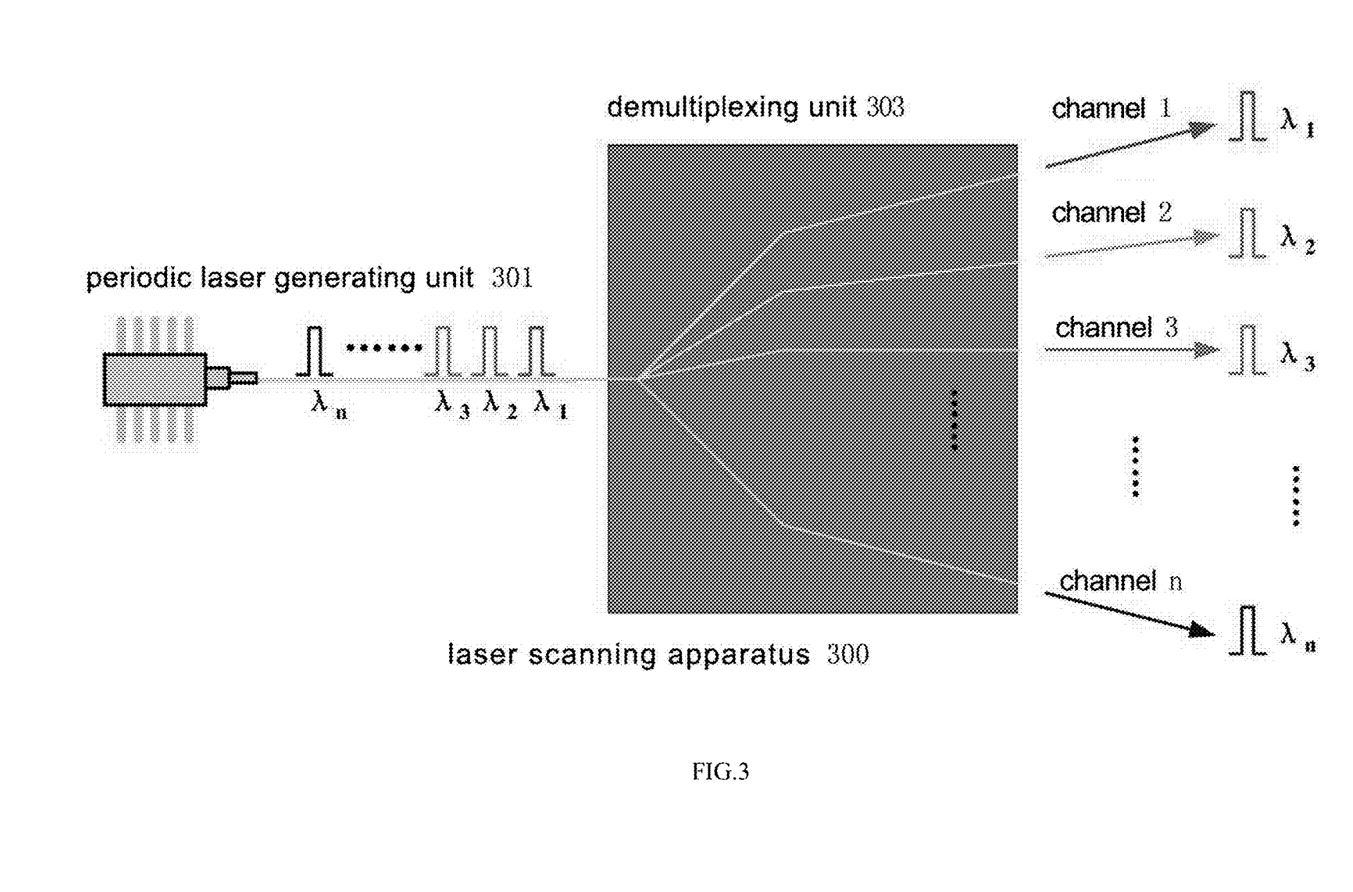
FIG. 3 is a schematic diagram of another laser scanning apparatus according to some embodiments of the present disclosure.

FIG. 3 illustrates an exemplary laser scanning apparatus 300 according to another embodiment of the present disclosure. The laser scanning apparatus 300 comprises a periodic laser generating unit 301 and a demultiplexing unit 303. The periodic laser generating unit 301 is similar to the periodic laser generating unit 201 described above. The plurality of output channels of the demultiplexing unit 303 have a certain included angle with each other, and, the laser beams output through the different channels will point in different directions, thereby realizing the laser scanning. The included angle between the channels can be of any suitable non-zero value, and each channel of the plurality of output channels can be spatially separated as long as they are not parallel to each other.

Figure 4:
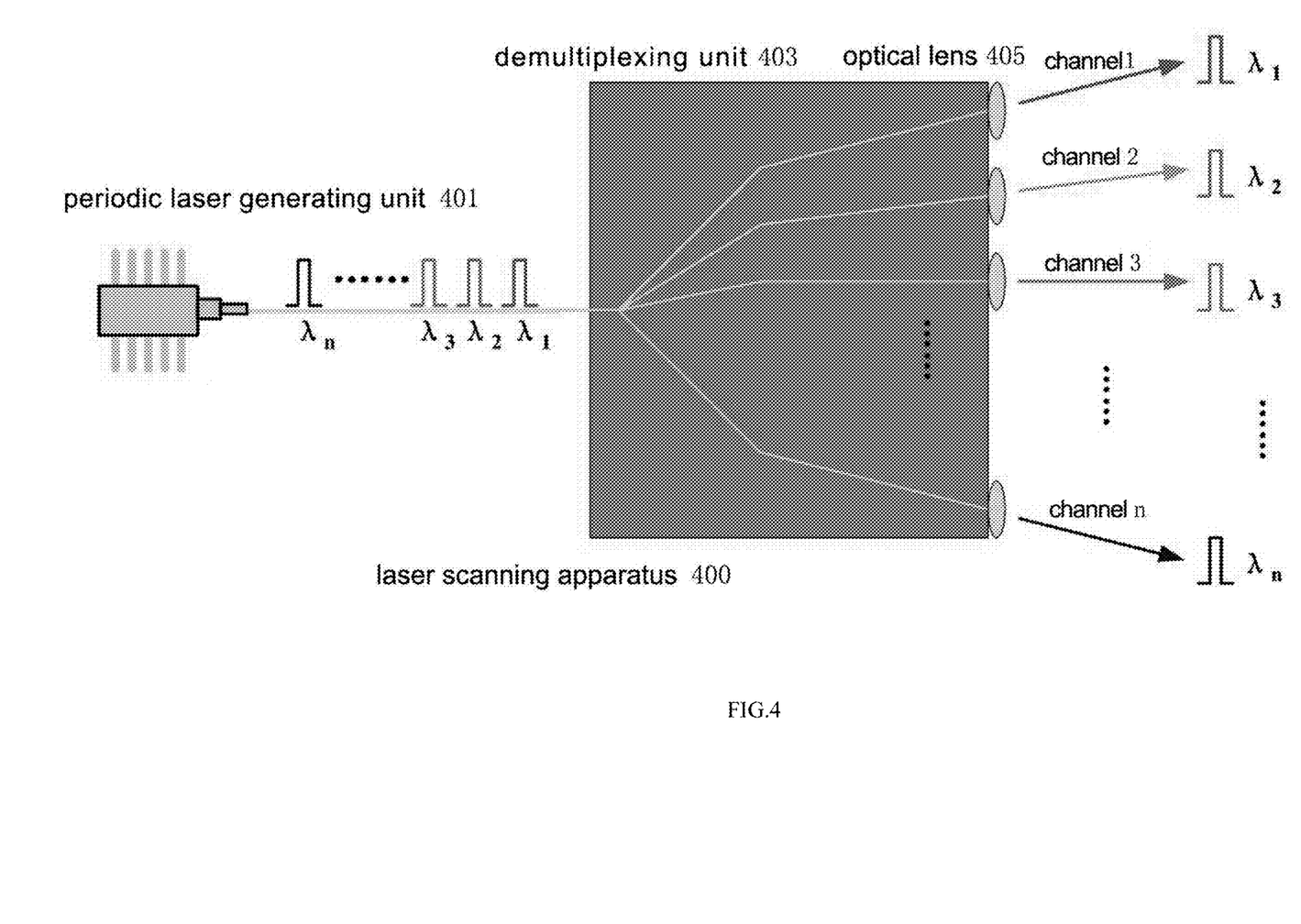
FIG. 4 is a schematic diagram of yet another laser scanning apparatus according to some embodiments of the present disclosure.

FIG. 4 illustrates an exemplary laser scanning apparatus 400 according to yet another embodiment of the present disclosure. The laser scanning device 400 comprises a periodic laser generating unit 401, a demultiplexing unit 403, and an optical lens 405. Each of the multiple output channels of the demultiplexing unit 403 is parallel to each other, so that the emergent light of each channel will exit in different directions and be spatially separated in the far field. The demultiplexing unit 403 outputs the laser beam with a certain divergence angle. In order to obtain a laser beam with a small divergence angle, an optical lens 405 may be placed at the output end of each output channel of the demultiplexing unit 403 to collimate the laser beam to achieve a laser beam scanning of the small divergence angle.

The mechanical scanning, electro-optical scanning, and acousto-optic scanning used in the existing laser scanning radar cannot simultaneously guarantee the scanning speed, scanning angle, and scanning laser power due to the limitation of the physical principles used. The laser scanning method and apparatus in the embodiments of the present disclosure utilize only input optical signal modulation and wavelength division multiplexing devices to achieve laser scanning; the scanning speed depends on the frequency of the optical signal modulation; the scanning angle and the bearable scanning laser power are dependent on the number of channels of the wavelength division multiplexer and the optical path configuration. Therefore, the laser scanning method and apparatus in the embodiments of the present disclosure provide simultaneous improvements in scanning speed, scanning angle, and scanning laser power in comparison with the prior art.

The specific embodiments of the present disclosure are not intended to be exhaustive or to limit the invention to the explicit form disclosed above. A wide variety of alternate and/or equivalent embodiments or implementations calculated to achieve the same purposes may be substituted by those skilled in the art for the embodiments shown and described without departing from the scope of the present disclosure. Although various processes or block diagrams may be recited in the present application in a given order, in alternative embodiments, the routines of these steps may be performed in different orders, or implementing a system with a block diagram of different orders. Some processes or blocks may be deleted, moved, added, subdivided, combined, and/or modified to provide alternative or sub-combinations. Further, although some processes or block diagrams may be shown as being executed continuously, these processes or block diagrams may be executed or implemented in parallel, or may be executed or implemented at different times. Furthermore, any specific numerical values indicated herein are merely examples. It is to be understood that different values or ranges may be employed in alternative embodiments.

As noted above, the particular terminology used in describing certain features or aspects of the present disclosure should not be regarded as implying that the term is redefined herein to be limited to any particular feature, characteristic, or aspect of the invention associated with the term. In general, the terms used in the appended claims should not be construed as limiting the invention to specific examples disclosed in the specification, except for those clearly defined in specific embodiments described above. Accordingly, the actual scope of the invention is not limited to the disclosed examples, but to cover all equivalent ways of practicing or implementing the invention in accordance with the claims.

I claim:

1. A laser scanning method, comprising:
   generating a periodic input laser signal, wherein each cycle of the input laser signal comprises multiple time periods, and wherein the input laser signal has a plurality of non-overlapping wavelengths in the multiple time periods;
   coupling each wavelength of the plurality of non-overlapping wavelengths of the input laser signal to a corresponding output channel of multiple spatially-separated output channels, and
   emitting light from each output channel at different exit angles from each other.

2. The laser scanning method of claim 1, wherein emitting light from each output channel at different exit angles from each other comprises utilizing one or more optical lenses to direct light to emit from each output channel at different exit angles from each other.

3. The laser scanning method of claim 1, wherein each channel of multiple output channels is not parallel to each other.

4. The laser scanning method of claim 3, wherein the light emitted from the multiple output channels is collimated by a plurality of lenses arranged at output ends of the multiple output channels.

5. A laser scanning apparatus, comprising:
   a periodic laser generating unit that generates a periodic input laser signal, wherein each cycle of the input laser signal comprises multiple time periods, and wherein the input laser signal has a plurality of non-overlapping wavelengths in the multiple time periods; and
   a demultiplexing unit that couples each wavelength of the plurality of non-overlapping wavelengths of the input laser signal to a corresponding output channel of multiple spatially-separated output channels, and that emits light from each output channel at different exit angles from each other.

6. The laser scanning apparatus of claim 5, wherein the demultiplexing unit comprises one or more optical lenses to direct light to emit from each output channel at different exit angles from each other.

7. The laser scanning apparatus of claim 5, wherein each channel of multiple output channels is not parallel to each other.

8. The laser scanning apparatus of claim 7, wherein the laser scanning apparatus further comprises a plurality of lenses arranged at output ends of the multiple output channels to collimate the light emitted from the multiple output channels.

* * * * *

UNITED STATES PATENT AND TRADEMARK OFFICE
CERTIFICATE OF CORRECTION

Page 1 of 1

PATENT NO. : 11,047,713 B2
APPLICATION NO. : 16/411146
DATED : June 29, 2021
INVENTOR(S) : Shaolan Zhu It is certified that error appears in the above-identified patent and that said Letters Patent is hereby corrected as shown below:

On the Title Page

Item (71) Applicant, Line 1, the name:
"NINGBO ONSIGHT CO., LTD."
Should read:
--Ningbo Osight Photoelectric Technology Co., Ltd.--

Item (73) Assignee, Line 1, the name:
"NINGBO ONSIGHT CO., LTD."
Should read:
--Ningbo Osight Photoelectric Technology Co., Ltd.--

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*